United States Patent [19]

Goossens et al.

[11] Patent Number: 5,894,219
[45] Date of Patent: Apr. 13, 1999

[54] MAGNETIC SENSOR INCLUDING A COIL SURROUNDING A PAIR OF MAGNETS, FOR DETECTING ROTARY MOTION

[75] Inventors: Andre F. L. Goossens, Rumst; Bernard Scholiers, Mechelen, both of Belgium

[73] Assignee: ITT Manufacturing Enterprises Inc., Wilmington, Del.

[21] Appl. No.: 08/860,406

[22] PCT Filed: Dec. 12, 1995

[86] PCT No.: PCT/EP95/04902

§ 371 Date: Sep. 5, 1997

§ 102(e) Date: Sep. 5, 1997

[87] PCT Pub. No.: WO96/20407

PCT Pub. Date: Jul. 4, 1996

[30] Foreign Application Priority Data

Dec. 24, 1994 [DE] Germany .................. 44 46 526

[51] Int. Cl.$^6$ ...................... G01P 3/488; G01P 3/44
[52] U.S. Cl. .................. 324/174; 310/155; 310/168; 324/207.25
[58] Field of Search ........................ 324/173, 174, 324/207.15, 207.25; 310/155, 168; 384/448; 188/181 R

[56] References Cited

U.S. PATENT DOCUMENTS 3,222,660  12/1965  Farrand .
5,019,774  5/1991   Rosenberg .
5,510,708  4/1996   Shirai et al. .................. 324/174

FOREIGN PATENT DOCUMENTS

| 0391160 | 10/1990 | European Pat. Off. . |
| 0532077 | 3/1993  | European Pat. Off. . |
| 2266974 | 1/1992  | France . |
| 2137800 | 5/1972  | Germany . |
| 3927007 | 2/1991  | Germany . |
| 4213977 | 11/1993 | Germany . |
| 93/22688 | 11/1993 | WIPO . |
| WO96/20407 | 7/1996 | WIPO . |

*Primary Examiner*—Gerard Strecker
*Attorney, Agent, or Firm*—Rader, Fishman & Grauer PLLC

[57] ABSTRACT

A device for determining rotary motions generally includes a signal generator with inwardly directed teeth or inwardly directed projections and a double-sided measuring coil which is arranged within the surface of the signal generator. The measuring coil has a core of permanent magnets and pole shoes. The pole shoes project from both sides of the coil and extend up to the inner surface of the signal generator. The pole shoes are designed, arranged and conformed to one another so that, whenever the end piece of a pole shoe points to a tooth or a projection, the second, diametrically opposite end of the pole shoe is directed to a tooth gap or depression. The measuring coil core is made up of at least two permanent magnets which are magnetized perpendicularly to the coil axis and respectively embedded between two pole shoes.

2 Claims, 2 Drawing Sheets

MAGNETIC SENSOR INCLUDING A COIL SURROUNDING A PAIR OF MAGNETS, FOR DETECTING ROTARY MOTION

BACKGROUND OF THE INVENTION

The present invention relates to a device for determining rotary motions and for generating an electric alternating signal representative of the rotary motion, including a signal generator which undergoes the rotary motion and, in the form of a ring, wheel, hollow cylinder, or a similar element, is provided with inwardly directed teeth or projections, and a stationary, inductive transducer which is arranged within the surface of the signal generator and is designed as a double-sided measuring coil that comprises a core of permanent magnets and elongated pole shoes which project from either side of the measuring coil up to the signal generator, wherein the inwardly directed teeth or projections and the pole shoes are designed, arranged and conformed to each other so that, whenever an end piece of a pole shoe points to a tooth or a projection, the second, diametrically opposite end piece of the pole shoe faces a tooth gap or depression.

German patent application No. 42 13 977 discloses a device of this type. In this device, a double-sided measuring coil is arranged in a signal generator ring with inwardly directed teeth. The measuring coil has a core made of a permanent magnet magnetized perpendicularly to the axis of the measuring coil. Mounted on the pole surfaces of the permanent magnet, i.e. between the core and coil, is one elongated pole shoe which projects from either side of the coil and reaches up to the inwardly directed teeth. The pole shoes and the inwardly directed teeth are offset from each other, or rather conformed to each other so that whenever a pole shoe end points to a tooth, the diametrically opposite pole shoe end points to a tooth gap.

Further, a rotational speed measuring device is disclosed in German patent application No. 39 27 007 which also has a toothed disc with inwardly directed teeth as a signal generator. Inside the signal generator, there is a diametrically aligned measuring coil. The coil encloses a magnetic flux guide piece the length of which approximately corresponds to the inside diameter, reduced by the necessary distance to allow an air gap between the ends of the flux guide piece and the teeth of the signal generator. The flux guide piece protrudes from both sides of the coil. Permanent magnets, oriented such that they are magnetized perpendicularly to the magnetic flux guide piece, are placed on the ends of the flux guide piece. If there are signal generator teeth opposite the two magnets of a coil side, a magnetic flux forms from the respective outside of the magnets through the toothed disc to the flux guide piece and then to the inside of the magnets. When the tooth gaps are opposite the two magnets, the main flux passes through the air gap to the flux guide piece and the insides of the magnets. Thus, on the two coil sides the magnetic flux is alternating through the magnetic flux guide piece depending on whether tooth gaps or teeth are opposite the magnets.

SUMMARY OF THE INVENTION

An object of the present invention is to provide an improved rotational speed measuring device of the type initially referred to, above all, to the effect of producing a higher useful signal without increasing the mounting space required. Also of special interest is achieving minimum possible manufacturing costs.

It has been found that this object can be achieved by a device including the provision of a coil core which, in the present invention, has at least two permanent magnets which are arranged parallel to the coil axis, magnetized perpendicularly to the measuring coil axis and respectively inserted between two elongated pole shoes. Appropriately, the adjacent permanent magnets, isolated by a pole shoe, respectively, are magnetized with opposed polarity.

In a preferred aspect of the present invention, the device includes a signal generator having an uneven number of teeth or projections and a measuring coil having a core which is made up of two elongated permanent magnets embedded between three pole shoes.

If the signal generator has an even number of teeth or an even number of projections, in another aspect of the present invention, a measuring coil is appropriately used which has a core that includes an uneven number (at least three) of elongated permanent magnets. The permanent magnets are embedded between a corresponding number of pole shoes (i.e. at least four pole shoes).

Further details of the present invention can be taken from the following description of embodiments making reference to the accompanying drawings.

DETAILED DESCRIPTION OF THE INVENTION

Figure 1:
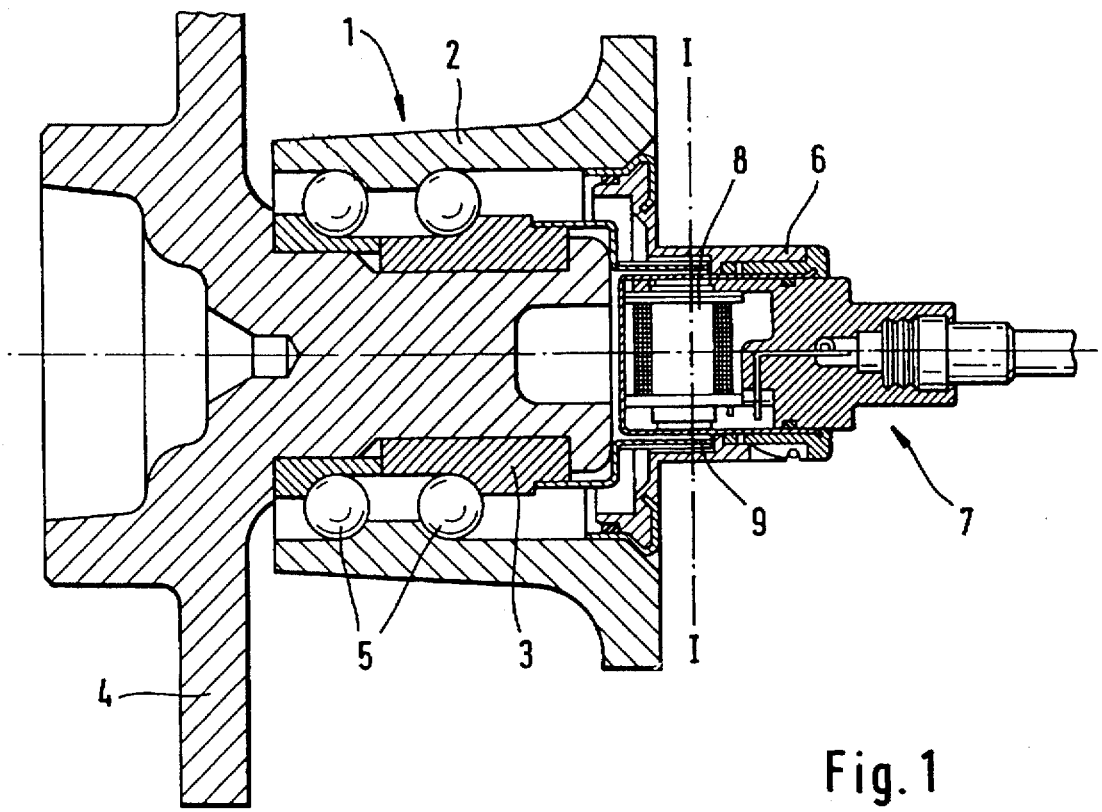
FIG. 1 is an axial cross-sectional view of a wheel bearing including an embodiment of a measuring device of the present invention.

FIG. 1 explains the principal design and the arrangement of a wheel bearing sensor embodying the advantages which are achieved by the measuring device as provided by the present invention.

FIG. 1 shows a wheel bearing 1 intended for use in an automotive vehicle. Generally, wheel bearing 1 includes a wheel bearing outside ring 2, a wheel bearing inside ring 3 into which a wheel shaft 4 is mounted, and wheel bearing balls 5. The axis of rotation of the wheel bearing 1 is also indicated by a dash-dotted line in FIG. 1.

A sensor housing 6 is connected to the stationary outside ring 2 attached to the vehicle. A transducer or sensor, designated by reference numeral 7 as a whole, is inserted or engaged in the sensor housing. A measuring coil 8 is arranged in the sensor housing. A bowl-type structure is provided as a transducer 9 and is seated on the inside ring 3 of the wheel bearing to rotate along with this inside ring. At the level of the measuring coil 8, the bowl-type structure has a signal generator ring 9 with inwardly directed teeth (not shown) or with undulations.

Figure 2:
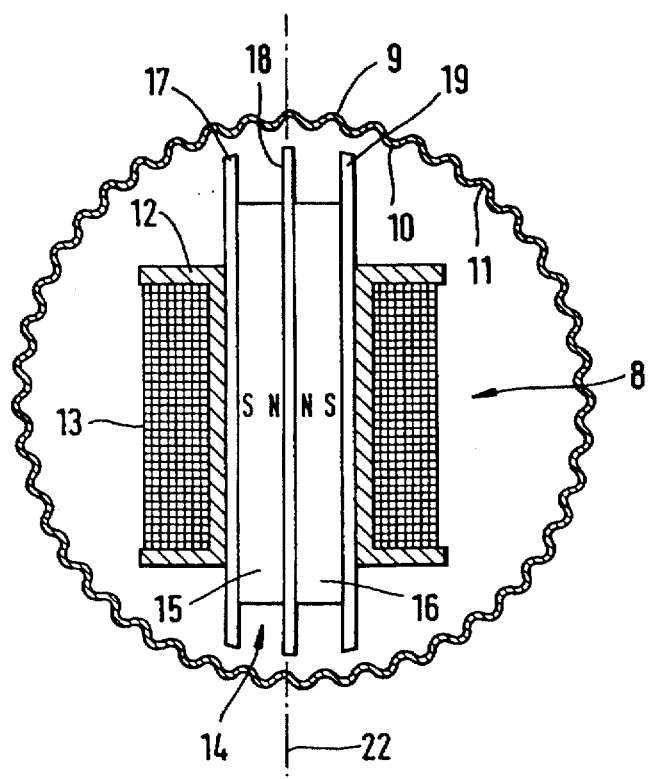
FIG. 2 is a schematic partial cross-sectional view, taken along line I/I in FIG. 1, showing the signal generator and the measuring coil of an embodiment of the present invention.

FIG. 2 shows the design of the measuring coil 8, which is essential for the present invention, and the arrangement of the individual components of the measuring coil 8 relative to the inwardly directed teeth, or, as in the present example, relative to the projections 10 and depressions 11 of an undulated structure which is used as signal generator 9. The projections 10, when viewed from the double-sided measuring coil 8, correspond to the teeth of a prior art signal generator of identical function, which is provided as a toothed wheel with inwardly directed teeth. The depressions 11 correspond to the tooth gaps. The illustrated structure of the signal generator 9 can be made, for example, in a favorable manner by deep-drawing a member made of thin sheet steel. This method is very inexpensive compared to the manufacture of a signal generator with inwardly directed teeth.

The most important components of the double-sided measuring coil 8 is a coil member 12, on which a coil winding 13 is mounted, and a coil core 14. Core 14 in FIG. 2 includes two elongated permanent magnets 15, 16 and three pole shoes 17, 18, 19 which are applied to the surfaces of the permanent magnets 15, 16. The permanent magnets 15, 16 are magnetized perpendicularly to the coil axis 22, indicated by a dash-dotted line, and have a reversed polarity. The north poles NN of the two permanent magnets 15, 16 meet on the intermediate pole shoe 18 in FIG. 2.

It is important for the function of the measuring device of the present invention that the pole shoes 17, 18, 19 project from both sides of the measuring coil 8 to extend (almost) as far as the inside of the signal generator ring 9. Further, the arrangement and the design should be so that when the end piece of a pole shoe is directed to a tooth or a projection 10 of the signal generator 9, the second, diametrically opposite end of the pole shoe is opposite a tooth gap or a depression 11 in the undulated structure shown. In the embodiment of FIG. 2 and the illustrated position, the upper (with respect to the drawing) end pieces of the pole shoes 17 and 19 point to teeth or projections 10, and the lower end pieces of the pole shoes point to tooth gaps or depressions 11. In the situation shown in FIG. 2, the intermediate pole shoe 18 upwards points to a depression 11 and downwards to a projection 10.

The measuring coil of FIG. 2 is especially appropriate for a signal generator having an uneven number of teeth. In this case, the measuring coil 8 can be supported centrally in the signal generator ring 9. Then, there is no need for a special shaping or bending of the pole shoes to position or adapt them to the teeth.

When use of a signal generator with an even number of teeth is desired, it is suitable to provide the measuring coil with a core having an even number of pole shoes, for example, four pole shoes and three permanent magnets on which the pole shoes abut.

Figure 3:
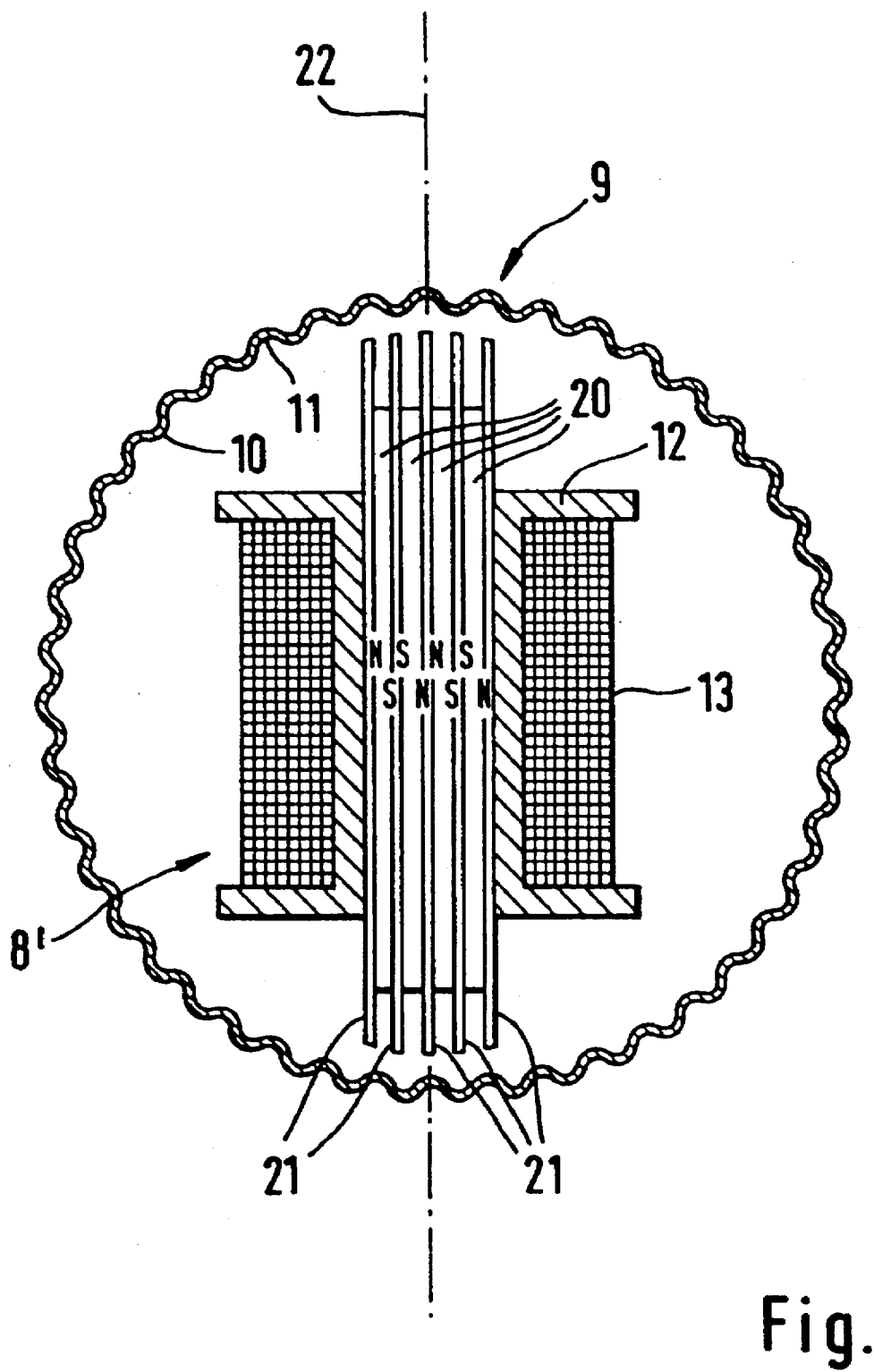
FIG. 3 is another variation of the measuring coil of the present invention in the same way of representation as in FIG. 2.

In some cases, i.e. when a particularly high useful voltage is required, it may be necessary to subdivide the coil core still more precisely. FIG. 3 shows an example. Five pole shoes 21 are provided and project from both sides of a measuring coil 8'. In turn, the pole shoes are separated by respectively one, i.e., by four permanent magnets 20 in total. In the embodiment shown, a relatively small pole shoe distance of only ½ tooth pitch was chosen. Appropriately, a plastic-embedded magnetic material was chosen for the manufacture of the permanent magnets 20 in a like core structure.

In the embodiment of FIG. 3, the permanent magnets 20 are also magnetized perpendicularly to the coil axis 22 and polarized so that in each case like poles meet each other on the boundaries isolated by the pole shoes 21.

The arrangement and design of the present invention permits achieving an increased useful signal in a relatively simple fashion, as compared to prior art measuring devices of this type. Alternatively, a larger air gap or a larger air gap tolerance is rendered possible, if necessary.

We claim:

1. A magnetic sensor for detecting rotary motion, comprising:

a ring shaped signal generator adapted for rotary motion, wherein said ring shaped signal generator includes inwardly directed projections, a stationary, inductive transducer residing proximate to said inwardly directed projections, said stationary inductive transducer including a coil surrounding first and second permanent magnets, wherein said permanent magnets have one of their like poles facing one another, and wherein said facing, like poles are separated by a first elongated pole shoe having opposing ends, wherein the inwardly directed projections and the opposing pole shoe ends are designed, arranged, and conformed to each other so that whenever one pole shoe end points to a projection, the opposite pole shoe end points to a gap between projections.

2. The sensors claimed in claim 1 wherein the signal generator has an odd number of inwardly directed projections and wherein said first permanent magnet is flanked by a second elongated pole shoe and wherein said second magnet is flanked by a third elongated pole shoe.

* * * * *